(12) United States Patent
Katanoda et al.

(10) Patent No.: US 11,709,072 B2
(45) Date of Patent: Jul. 25, 2023

(54) INFORMATION INSTRUMENT, INFORMATION PROVIDING SYSTEM, INFORMATION PROVIDING SERVER, AND INFORMATION PROVIDING METHOD

(71) Applicant: Toyota Jidosha Kabushiki Kaisha, Toyota (JP)

(72) Inventors: Tomoya Katanoda, Toyota (JP); Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 366 days.

(21) Appl. No.: 16/884,551

(22) Filed: May 27, 2020

(65) Prior Publication Data

US 2020/0378784 A1    Dec. 3, 2020

(30) Foreign Application Priority Data

May 29, 2019  (JP) .................... 2019-100431

(51) Int. Cl.
*G01C 21/36* (2006.01)
*B60L 53/66* (2019.01)

(52) U.S. Cl.
CPC .......... *G01C 21/3682* (2013.01); *B60L 53/66* (2019.02); *G01C 21/3661* (2013.01)

(58) Field of Classification Search
CPC ............ G01C 21/3682; G01C 21/3661; G01C 21/3469; G01C 21/3461; B60L 53/66; B60L 53/67; B60L 53/68; B60L 2240/622; B60L 2240/72; B60L 2250/16; B60L 53/00; Y02T 10/70; Y02T 10/7072; Y02T 10/72; Y02T 90/12; Y02T 90/16;
(Continued)

(56) References Cited

U.S. PATENT DOCUMENTS

| | | | |
|---|---|---|---|
| 2014/0028257 A1* | 1/2014 | Nishida | B60L 53/66 320/109 |
| 2018/0118028 A1 | 5/2018 | Ueo et al. | |
| 2020/0217679 A1* | 7/2020 | DeLuca | G01C 21/3484 |

(Continued)

FOREIGN PATENT DOCUMENTS

| | | |
|---|---|---|
| EP | 2175239 B1 * | 3/2016 |
| JP | 2003-262525 A | 9/2003 |

(Continued)

OTHER PUBLICATIONS

ChargeMap Mobile app 2014, https://www.youtube.com/watch?v=5BmA3DUQMi0, Sep. 30, 2014.*

(Continued)

*Primary Examiner* — Muhammad Shafi
(74) *Attorney, Agent, or Firm* — Dinsmore & Shohl LLP

(57) ABSTRACT

A vehicle provides information on a plurality of chargers that charge a battery mounted on the vehicle. The vehicle includes a navigation screen and an ECU. The ECU controls the navigation screen to show a map and to show a plurality of icons corresponding to the plurality of chargers at corresponding positions of the plurality of chargers on the map. The ECU controls the navigation screen to show the plurality of icons to allow identification of a charging type to which each of the plurality of chargers is adapted and magnitude of electric power that can be output under the charging type.

20 Claims, 13 Drawing Sheets

(58) Field of Classification Search
CPC ........ Y02T 90/14; Y02T 90/167; Y04S 30/12; G01R 31/371; G01R 31/388; G01R 31/389
USPC .......................................................... 701/523
See application file for complete search history.

(56) References Cited

U.S. PATENT DOCUMENTS

| 2020/0238847 | A1* | 7/2020 | Wiseman | B60L 53/67 |
| 2020/0282854 | A1* | 9/2020 | Liu | B60L 53/67 |
| 2020/0324667 | A1* | 10/2020 | Yaldo | B60L 58/12 |

FOREIGN PATENT DOCUMENTS

| JP | 2011-248787 A | 12/2011 |
| JP | 2011-252816 A | 12/2011 |
| JP | 2012-032354 A | 2/2012 |
| JP | 2012-132817 A | 7/2012 |
| JP | 2013-170932 A | 9/2013 |
| JP | 2013-213799 A | 10/2013 |
| JP | 2017-135941 A | 8/2017 |
| JP | 2018-074713 A | 5/2018 |
| JP | 6516905 B1 | 5/2019 |

OTHER PUBLICATIONS

How To Find Free EV Charging Stations on a Trip—Plugshare App, https://www.youtube.com/watch?v=GlsF91A0f0I, Feb. 3, 2019.*
ChargeMap Mobile app 2014, https://www.youtube.com/watch?v=5BmA3DUQMi0, Sep. 30, 2014 (Year: 2014).*
How To Find Free EV Charging Stations on a Trip—Plugshare App, https://www.youtube.com/watch?v=GlsF91A0f0I, Feb. 3, 2019 (Year: 2019).*
Electric Vehicle Charging Stand Information, Nov. 14, 2018, https://www.facebook.com/evnavi/photos/a.344939752186290/2402858699727708/?Type=3.

* cited by examiner

<CHARGER INFORMATION>

| CHARGER ID | INSTALLATION POSITION | CHARGING TYPE | MAXIMUM OUTPUT POWER |
|---|---|---|---|
| B10001 | | NORMAL CHARGING | 8kW |
| B10002 | | QUICK CHARGING | 120kW |
| B10003 | | NORMAL CHARGING | 25kW |
| ⋮ | | ⋮ | ⋮ |

FIG.9

<CHARGER INFORMATION>

| CHARGER ID | INSTALLATION POSITION | CHARGING TYPE | MAXIMUM OUTPUT POWER | CHARGING FEE |
|---|---|---|---|---|
| B10001 | | NORMAL CHARGING | 8kW | |
| B10002 | | QUICK CHARGING | 120kW | |
| B10003 | | NORMAL CHARGING | 25kW | |
| ⋮ | | ⋮ | ⋮ | |

FIG.10

SELECT DESIRED CONDITION

NORMAL CHARGING    QUICK CHARGING 3.3 kW OR LOWER | 6.6 kW OR LOWER | 9.9 kW OR LOWER | 20 kW OR LOWER | EXCEEDING 20 kW

FIG.13

<CHARGER INFORMATION>

| CHARGER ID | INSTALLATION POSITION | CHARGING TYPE | MAXIMUM OUTPUT POWER | OPERATING HOURS | DEGREE OF CONGESTION |
|---|---|---|---|---|---|
| B10001 | | NORMAL CHARGING | 8kW | | |
| B10002 | | QUICK CHARGING | 120kW | | |
| B10003 | | NORMAL CHARGING | 25kW | | |
| ⋮ | | ⋮ | ⋮ | | | ium # INFORMATION INSTRUMENT, INFORMATION PROVIDING SYSTEM, INFORMATION PROVIDING SERVER, AND INFORMATION PROVIDING METHOD

CROSS REFERENCE TO RELATED APPLICATIONS

This nonprovisional application claims priority to Japanese Patent Application No. 2019-100431 filed with the Japan Patent Office on May 29, 2019, the entire contents of which are hereby incorporated by reference.

BACKGROUND

Field

The present disclosure relates to an information instrument, an information providing system, an information providing server, and an information providing method, and more particularly to a technique for providing a user with information on a plurality of chargers that charge a power storage device mounted on a vehicle.

Description of the Background Art

Plug-in hybrid vehicles and electric vehicles have increasingly been used in recent years. These vehicles are adapted to "external charging" for charging a vehicle-mounted power storage device with electric power supplied from a charger provided outside the vehicles. In order to improve convenience of a user, it has been proposed to provide a user with various types of information relating to the chargers. For example, an information providing apparatus disclosed in Japanese Patent Laying-Open No. 2011-248787 provides a user with information on whether a charger is public or private, together with position information of the charger.

SUMMARY

For example, when a vehicle should externally be charged while a user is on the road, position information of a charger may be provided to the user through an image shown on an information instrument such as a car navigation system or a smartphone. More specifically, the image shows on a map, icons corresponding to a plurality of chargers installed around a current location of the vehicle. The user can determine with which charger the user's vehicle is to externally be charged, by referring to the image.

There are various models of chargers and electric power that can be output from the chargers may be different for each charger. As a charger is able to output higher electric power, the charger spends shorter time for external charging. Therefore, the user is desirably provided also with electric power information of the charger in addition to position information of the charger.

With widespread use of the vehicles, the number of chargers is also expected to increase in the future. Then, a large number of chargers may be shown in an image. In this case, simply showing output electric power of the chargers leads to a confusing image and the user may feel burdensome about an act to determine a charger.

The present disclosure was made to solve the problem above, and an object thereof is to allow a user to readily determine (select) an appropriate charger from among a plurality of candidate chargers.

(1) An information instrument according to one aspect of the present disclosure provides information on a plurality of chargers that charge a power storage device mounted on a vehicle. The information instrument includes a display and a controller that controls the display to show a map and to show a plurality of icons corresponding to the plurality of chargers at corresponding positions of the plurality of chargers on the map. The controller controls the display to show the plurality of icons to allow identification of (i) a charging type to which each of the plurality of chargers is adapted and (ii) magnitude of electric power that can be output under the charging type.

(2) The controller controls the display to show, for each charging type, the plurality of icons to emphasize an icon corresponding to a charger higher in electric power that can be output under the charging type among the plurality of chargers, as compared with a charger lower in electric power that can be output under the charging type.

(3) The controller emphasizes the corresponding icon of the charger higher in electric power that can be output under the charging type.

(4) The controller emphasizes the corresponding icon by adjusting a size of each of the plurality of icons.

(5) The controller emphasizes the corresponding icon by adjusting at least one of a color and a density of each of the plurality of icons.

(6) The controller emphasizes the corresponding icon by showing a badge as being superimposed on or being in proximity to each of the plurality of icons.

According to the configuration in (1) to (6), without the need for a user to read a numeric value indicating electric power that can be output from each charger for comparison among the chargers, the user can intuitively know which charger is high in electric power that it can output. Therefore, the user can readily determine an appropriate charger.

(7) The controller controls the display to show on the map, ranking of recommendation to a user of the vehicle, of each of the plurality of chargers. The ranking of recommendation is determined based on a distance between a position of each of the plurality of chargers and the vehicle, and a charging fee of each of the plurality of chargers.

According to the configuration in (7), the user can readily determine a charger close to the vehicle and inexpensive.

(8) The controller controls a manner of representation of the plurality of icons so as not to emphasize an icon corresponding to a charger of which operating time remaining until operation end time is shorter than a prescribed time period among the plurality of chargers, as compared with a charger of which remaining operating time is longer than the prescribed time period.

(9) The controller controls a manner of representation of the plurality of icons so as not to emphasize an icon corresponding to a charger of which degree of congestion is higher than a prescribed value among the plurality of chargers, as compared with a charger of which degree of congestion is lower than the prescribed value.

According to the configuration in (8) and (9), time remaining until operation end time of each charger (for example, time of end of operation of a charging station) or a degree of congestion thereof is reflected on representation of the icon of the charger so that a charger that will end operation shortly or is congested does not stand out. Therefore, the user can readily determine a charger suitable for external charging.

(10) The controller controls the display to selectively show an icon corresponding to a charger installed within a determined area including a destination or a registered point of the vehicle.

After the vehicle arrives at the destination or the registered point, the user is highly likely to have things to do. Therefore, while the user is doing what the user has to do at the destination or the like, there may be an idle time during which the vehicle can externally be charged. According to the configuration in (10), the user can readily select a charger with which the vehicle can externally be charged by making use of this idle time.

(11) The controller controls the display to show, when any icon is selected from among the plurality of icons, detailed information on a charger corresponding to the selected icon.

According to the configuration in (11), the user can readily check detailed information on the charger selected by the user himself/herself.

(12) An information providing system according to another aspect of the present disclosure provides information on a plurality of chargers that charge a power storage device mounted on a vehicle. The information providing system includes a display that shows a map and a server that determines a manner of representation of a plurality of icons corresponding to the plurality of chargers to allow identification of (i) a charging type to which each of the plurality of chargers is adapted and (ii) magnitude of electric power that can be output under the charging type and transmits the determined manner of representation to the display. The display shows the plurality of icons in the manner of representation determined by the server, at corresponding positions of the plurality of chargers on the map.

(13) An information providing server according to yet another aspect of the present disclosure provides information on a plurality of chargers that charge a power storage device mounted on a vehicle. The information providing server determines a manner of representation of a plurality of icons corresponding to the plurality of chargers shown at corresponding positions of the plurality of chargers on a map. The manner of representation is determined to allow identification of (i) a charging type to which each of the plurality of chargers is adapted and (ii) magnitude of electric power that can be output under the charging type.

According to the configuration in (12) and (13), as in the configuration in (1), the user can readily determine an appropriate charger.

(14) An information providing method according to still another aspect of the present disclosure provides information on a plurality of chargers that charge a power storage device mounted on a vehicle. The information providing method includes obtaining a position of each of the plurality of chargers and electric power that can be output from each of the plurality of chargers and showing on a map, a plurality of icons corresponding to positions of the plurality of chargers. The showing a plurality of icons includes showing the plurality of icons to allow identification of (i) a charging type to which each of the plurality of chargers is adapted and (ii) magnitude of electric power that can be output under the charging type.

According to the method in (14), as in the configuration in (1), the user can readily determine an appropriate charger.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 9 is a conceptual diagram for illustrating exemplary charger information in a second embodiment.

FIG. 10 is a diagram showing an exemplary navigation image for obtaining a condition desired by a user.

FIG. 13 is a conceptual diagram for illustrating exemplary charger information in a third embodiment.

DETAILED DESCRIPTION

Figure 1:
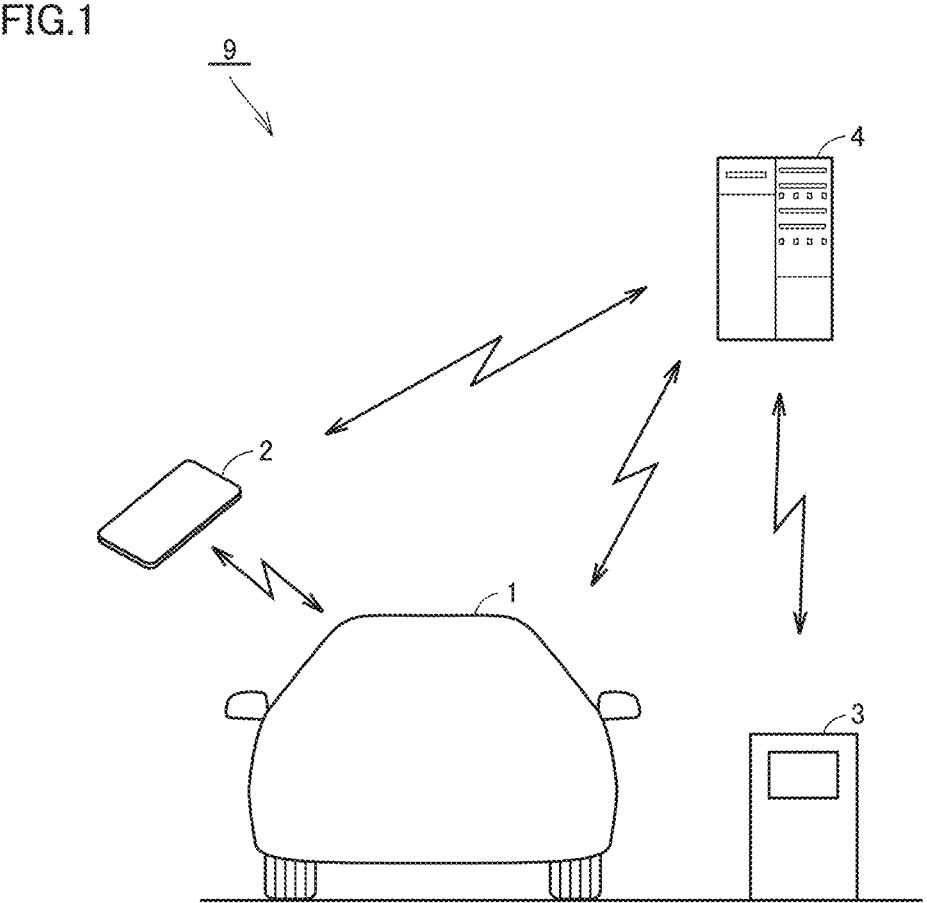
FIG. 1 is a diagram schematically showing an overall configuration of a charging system according to a first embodiment.

The present embodiment will be described below in detail with reference to the drawings. The same or corresponding elements in the drawings have the same reference characters allotted and description thereof will not be repeated.

First Embodiment

<Configuration of Charging System>

FIG. 1 is a diagram schematically showing an overall configuration of a charging system according to a first embodiment. Referring to FIG. 1, a charging system 9 includes a vehicle 1 of one user, a portable terminal 2 possessed by the user, a charger 3, and a remotely provided server 4. Though FIG. 1 shows only a single charger 3, a large number of chargers 3 are actually installed at various locations.

A battery 40 (see FIG. 2) for traveling is mounted on vehicle 1. Vehicle 1 is adapted to "external charging" for charging battery 40 with electric power supplied from charger 3 while vehicle 1 and charger 3 are electrically connected to each other through a charge cable 31 (see FIG. 2).

Examples of portable terminal 2 include a smartphone, a smart watch, a tablet personal computer (PC), or a mobile notebook PC of a user.

Charger 3 is installed, for example, at a public charging station (which is also called a charging spot). Charger 3 supplies electric power for external charging of vehicle 1. Specifically, charger 3 may be a charger that carries out "normal charging" for supplying alternating current (AC)

power (for example, three-phase electric power at 200 V) supplied from a system power supply such as a commercial power supply as it is to vehicle 1. Charger 3 may be a charger that carries out "quick charging" for supplying electric power to vehicle 1 after it converts AC power supplied from the system power supply into direct current (DC) power.

Server 4 manages information used for external charging of a large number of vehicles including vehicle 1. Vehicle 1 and server 4 can bidirectionally communicate with each other. Portable terminal 2 and server 4 can bidirectionally communicate with each other. Server 4 can thus transmit and receive necessary information to and from vehicle 1 and portable terminal 2. Charger 3 and server 4 can also bidirectionally communicate with each other. Server 4 can thus collect, for example, information on charger 3. Server 4 corresponds to the "information providing server" according to the present disclosure. Charging system 9 corresponds to the "information providing system" according to the present disclosure.

Figure 2:
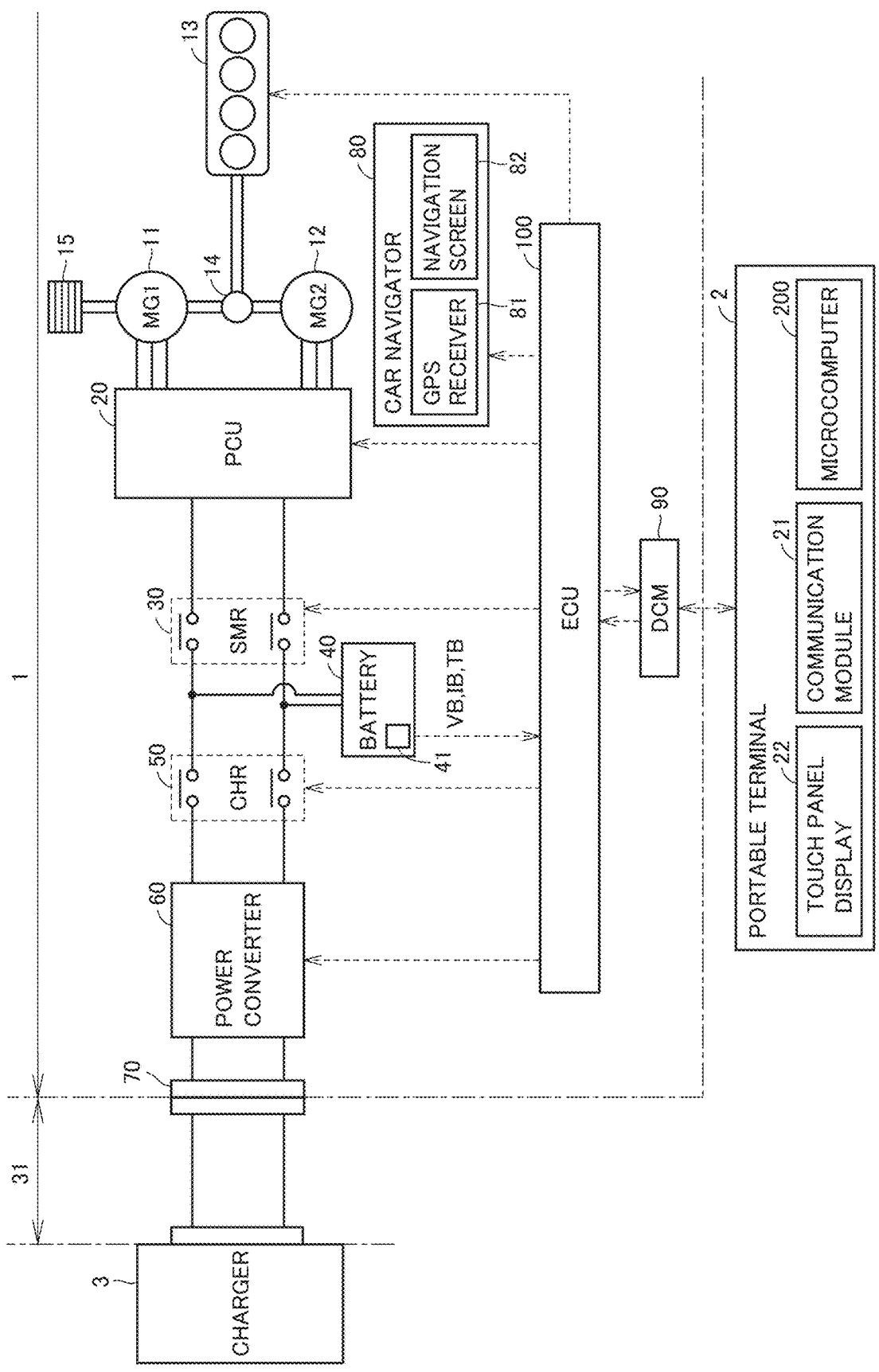
FIG. 2 is a diagram showing in further detail a configuration of a vehicle, a portable terminal, and a charger.

FIG. 2 is a diagram showing in further detail a configuration of vehicle 1, portable terminal 2, and charger 3. An example in which a plug-in hybrid vehicle (PHV) is defined as vehicle 1 will be described in the present embodiment with reference to FIGS. 1 and 2. Since vehicle 1 should only be a vehicle that can externally be charged, it may be an electric vehicle (EV) or a fuel cell vehicle (FCV). In the example shown in FIG. 2, a smartphone is defined as portable terminal 2.

Vehicle 1 includes motor generators 11 and 12, an engine 13, a power divider 14, a drive wheel 15, a power control unit (PCU) 20, a system main relay (SMR) 30, battery 40, a charge relay 50, a power converter 60, an inlet 70, a car navigation system (which will be abbreviated as a "car navigator" below) 80, a digital communication module (DCM) 90, and an electronic control unit (ECU) 100. Vehicle 1 represents one example of the "information instrument" according to the present disclosure.

Each of motor generators 11 and 12 is, for example, a three-phase AC rotating electric machine having a permanent magnet embedded in a rotor (not shown). Motor generator 11 is coupled to a crankshaft of engine 13 with power divider 14 being interposed. Motor generator 11 rotates the crankshaft of engine 13 by using electric power of battery 40 when engine 13 is started. Motor generator 11 can also generate electric power by using motive power of engine 13. AC power generated by motor generator 11 is converted to DC power by PCU 20 and battery 40 is charged therewith. AC power generated by motor generator 11 may also be supplied to motor generator 12.

Motor generator 12 rotates a driveshaft by using at least one of electric power from battery 40 and electric power generated by motor generator 11. Motor generator 12 can also generate electric power by regenerative braking. AC power generated by motor generator 12 is converted to DC power by PCU 20 and battery 40 is charged therewith.

Engine 13 is an internal combustion engine such as a gasoline engine or a diesel engine, and generates motive power for traveling of vehicle 1 in accordance with a control signal from ECU 100. Power divider 14 is implemented, for example, by a planetary gear mechanism, and it divides motive power generated by engine 13 into motive power to be transmitted to drive wheel 15 and motive power to be transmitted to motor generator 11.

PCU 20 converts DC power stored in battery 40 into AC power and supplies AC power to motor generators 11 and 12 in accordance with a control signal from ECU 100. PCU 20 converts AC power generated by motor generators 11 and 12 into DC power and supplies DC power to battery 40.

SMR 30 is electrically connected to a power line that connects PCU 20 and battery 40 to each other. SMR 30 switches between supply and cut-off of electric power between PCU 20 and battery 40 in accordance with a control signal from ECU 100.

Battery 40 is implemented by a battery assembly that supplies electric power for generating driving force of vehicle 1 to PCU 20. Battery 40 stores electric power generated by motor generator 11. Battery 40 corresponds to the "power storage device" according to the present disclosure. Vehicle 1 may include a capacitor such as an electric double layer capacitor instead of the battery.

A monitoring unit 41 is provided in battery 40. Monitoring unit 41 includes a voltage sensor, a current sensor, and a temperature sensor, none of which is shown. The voltage sensor detects a voltage VB of battery 40. The current sensor detects a current IB input to and output from battery 40. The temperature sensor detects a temperature TB of battery 40. Each sensor outputs a result of detection to ECU 100. ECU 100 calculates a state of charge (SOC) of battery 40 or carries out external charging of vehicle 1 based on a result of detection from each sensor.

Charge relay 50 is electrically connected to a power line that connects battery 40 and power converter 60 to each other. Charge relay 50 switches between supply and cut-off of electric power between battery 40 and power converter 60 in accordance with a control signal from ECU 100.

Power converter 60 converts electric power supplied from charger 3 into electric power for charging battery 40. In the present embodiment, vehicle 1 is adapted to both of normal charging and quick charging. Therefore, power converter 60 includes an AC/DC converter and a DC/DC converter (neither of which is shown). The AC/DC converter converts AC power supplied from charger 3 which is a normal charger through charge cable 31 and inlet 70 into DC power and outputs DC power to charge relay 50. The DC/DC converter down-converts DC power at a high voltage supplied from charger 3 which is a quick charger and outputs down-converted DC power to charge relay 50. When charger 3 is a quick charger, the DC/DC converter may be omitted from the vehicle 1 in some embodiments.

Inlet 70 is a charge port to which a connector (not shown) provided at a tip end of charge cable 31 extending from charger 3 can mechanically be coupled.

Car navigator 80 performs various types of processing for showing a travel path of vehicle 1 to a user. Furthermore, car navigator 80 performs various types of processing for providing a user with information on charger 3 (which is also denoted as "charger information") used for external charging of vehicle 1.

More specifically, car navigator 80 includes a global positioning system (GPS) receiver 81 and a monitor with touch panel (which is also denoted as a "navigation screen" below) 82. GPS receiver 81 identifies a position of vehicle 1 based on radio waves transmitted from an artificial satellite (not shown). Navigation screen 82 accepts an operation by a user or shows an image representing various types of information output from ECU 100. Navigation screen 82 corresponds to the "display" according to the present disclosure.

DCM 90 can bidirectionally wirelessly communicate with server 4. DCM 90 may be able to bidirectionally communicate also with portable terminal 2 of a user.

ECU 100 includes a central processing unit (CPU), a memory, and an input and output port, none of which is shown. ECU 100 outputs a control signal based on input of a signal from each sensor as well as a map and a program stored in the memory and controls each device (including car navigator 80) to set vehicle 1 to be in a desired state. Examples of main control by ECU 100 in the present embodiment include "charging representation processing" for providing a user with information on charger 3 (charger information) to be used for external charging of vehicle 1 through navigation screen 82. This processing will be described in detail later. ECU 100 corresponds to the "controller" according to the present disclosure. ECU 100 may be configured as being divided into a plurality of ECUs for each function.

Portable terminal 2 includes a communication module 21, a touch panel display 22, and a microcomputer 200. Communication module 21 can bidirectionally wirelessly communicate with vehicle 1 or server 4. Touch panel display 22 shows an image representing various types of information on vehicle 1 obtained from vehicle 1 or server 4. Touch panel display 22 can also accept an operation by a user. Microcomputer 200 includes a CPU, a memory, and an input and output port (none of which is shown) and controls communication module 21 and touch panel display 22. Though not shown, microcomputer 200 may further include a graphics processing unit (GPU). Portable terminal 2 represents another exemplary "information instrument" according to the present disclosure. In this case, touch panel display 22 corresponds to the "display" according to the present disclosure and microcomputer 200 corresponds to the "controller" according to the present disclosure.

<Search for Charger>

For example, when external charging of vehicle 1 becomes necessary while a user is on the road, the user operates navigation screen 82 to search for charger 3 around vehicle 1. Then, a result of search for charger 3 installed around vehicle 1 is provided to vehicle 1 through communication with server 4, and shown as an image on navigation screen 82 (which is also denoted as a "navigation image" below). More specifically, in the navigation image, icons (icons representing positions of chargers 3) corresponding to a plurality of chargers 3 installed around vehicle 1 are arranged on a map. The user can determine with which charger 3 vehicle 1 is to externally be charged, by referring to the navigation image. Though an example in which information is provided to a user through navigation screen 82 is described below, information can similarly be provided also by using portable terminal 2.

There are various models of chargers and electric power that can be output (which is also denoted as "maximum output power" below) from the chargers may be different for each charger. As a charger is higher in maximum output power, the charger spends shorter time for external charging. Therefore, the user is desirably provided also with information on maximum output power of charger 3 in addition to position information of the charger.

With widespread use of the vehicles, the number of chargers is also expected to increase in the future. Then, a large number of chargers may be shown in a navigation image. In this case, simply showing maximum output power of the chargers leads to a confusing image and the user may feel burdensome about an act to determine a charger.

In the present embodiment, such a configuration that a charging type and maximum output power of each charger 3 can be identified by setting for each charger, a manner of showing an icon representing a position of each charger 3 is adopted. Thus, without the need for reading a numeric value representing electric power that can be output from each charger 3 for comparison among chargers 3, a user can intuitively know which charger 3 is high in maximum output power. Therefore, the user can readily determine appropriate charger 3.

Figure 3:
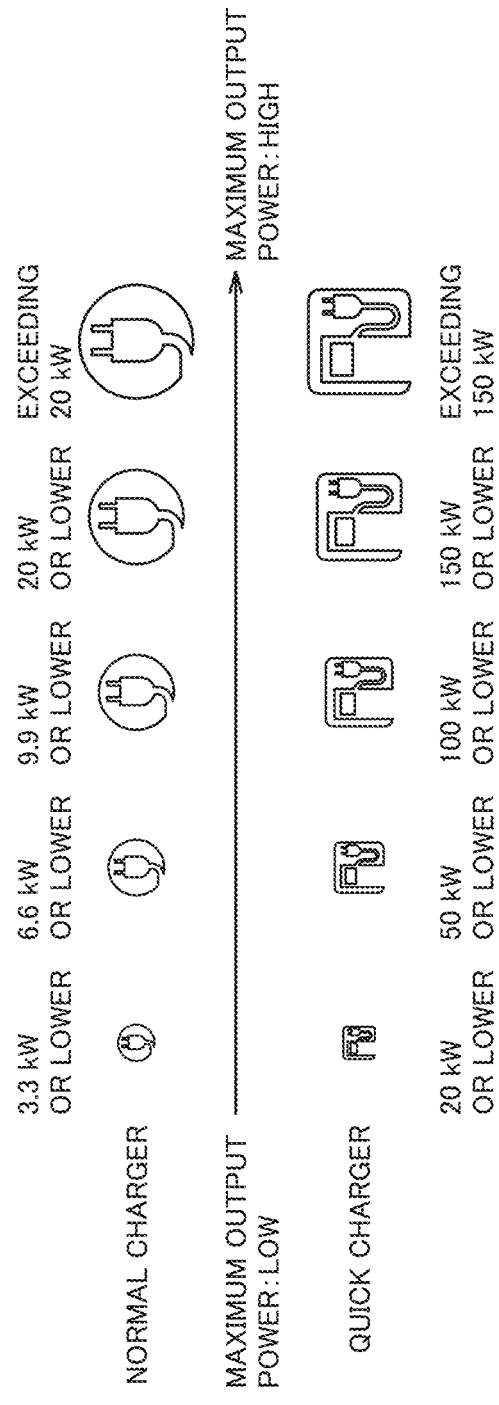
FIG. 3 is a diagram for illustrating a manner of showing an icon representing a charger in the first embodiment.

FIG. 3 is a diagram for illustrating a manner of showing an icon representing charger 3 in the first embodiment. Referring to FIG. 3, some vehicles are adapted only to one of normal charging and quick charging and hence normal charging and quick charging are desirably distinguished from each other. In this example, maximum output power in normal charging is categorized into five levels and a size of an icon is larger as maximum output power is higher. Similarly, maximum output power in quick charging is categorized into five levels and a size of an icon is larger as maximum output power is higher.

Categorization into five levels is merely by way of example and categorization into only two to four levels or categorization into six levels or more may be applicable. It is noted for confirmation purpose that a numeric value of maximum output power shown in FIG. 3 is merely by way of example.

<Flow of Showing Charger>

Figure 4:
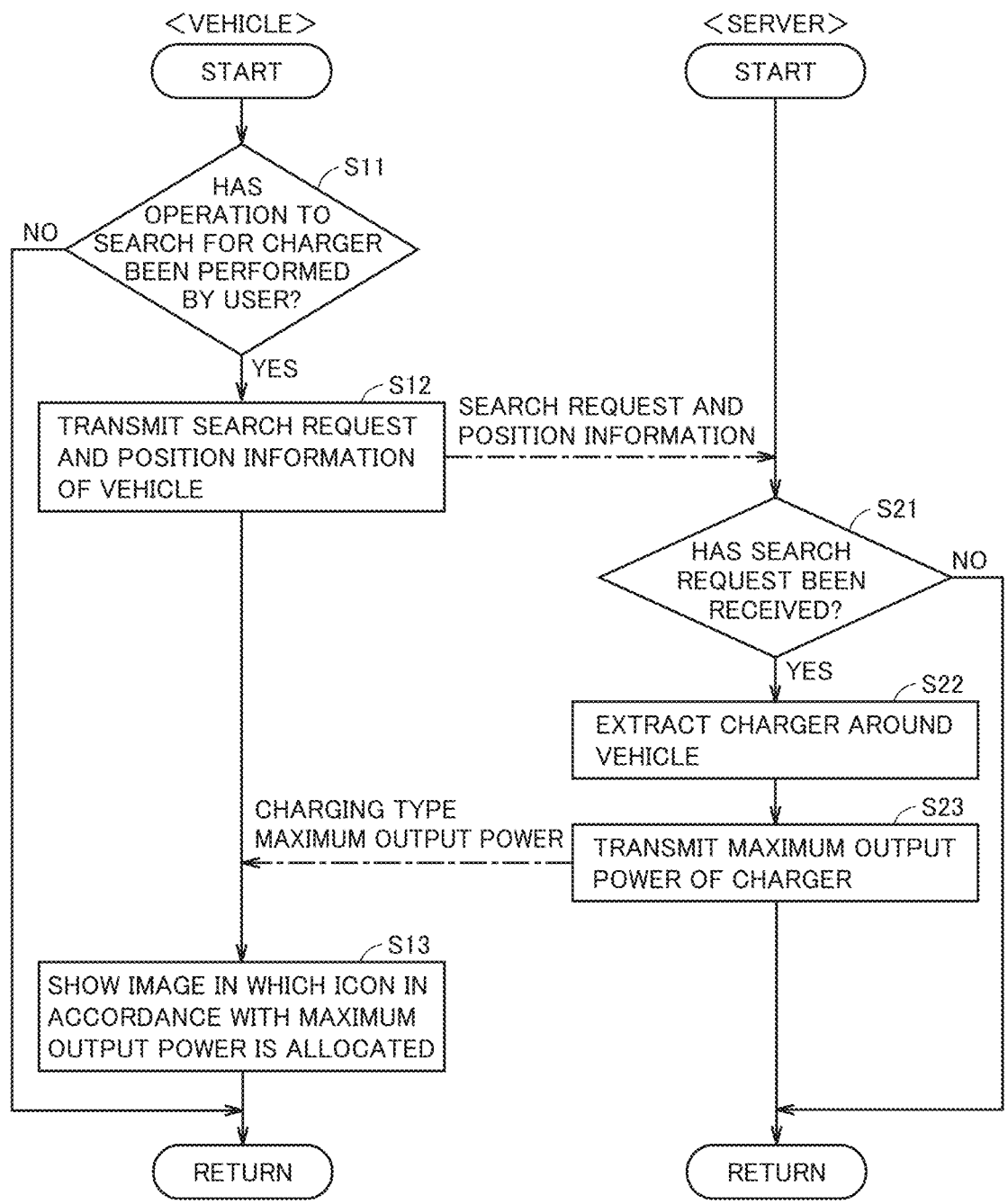
FIG. 4 is a flowchart for illustrating processing for showing a charger in the first embodiment.
Figure 12:
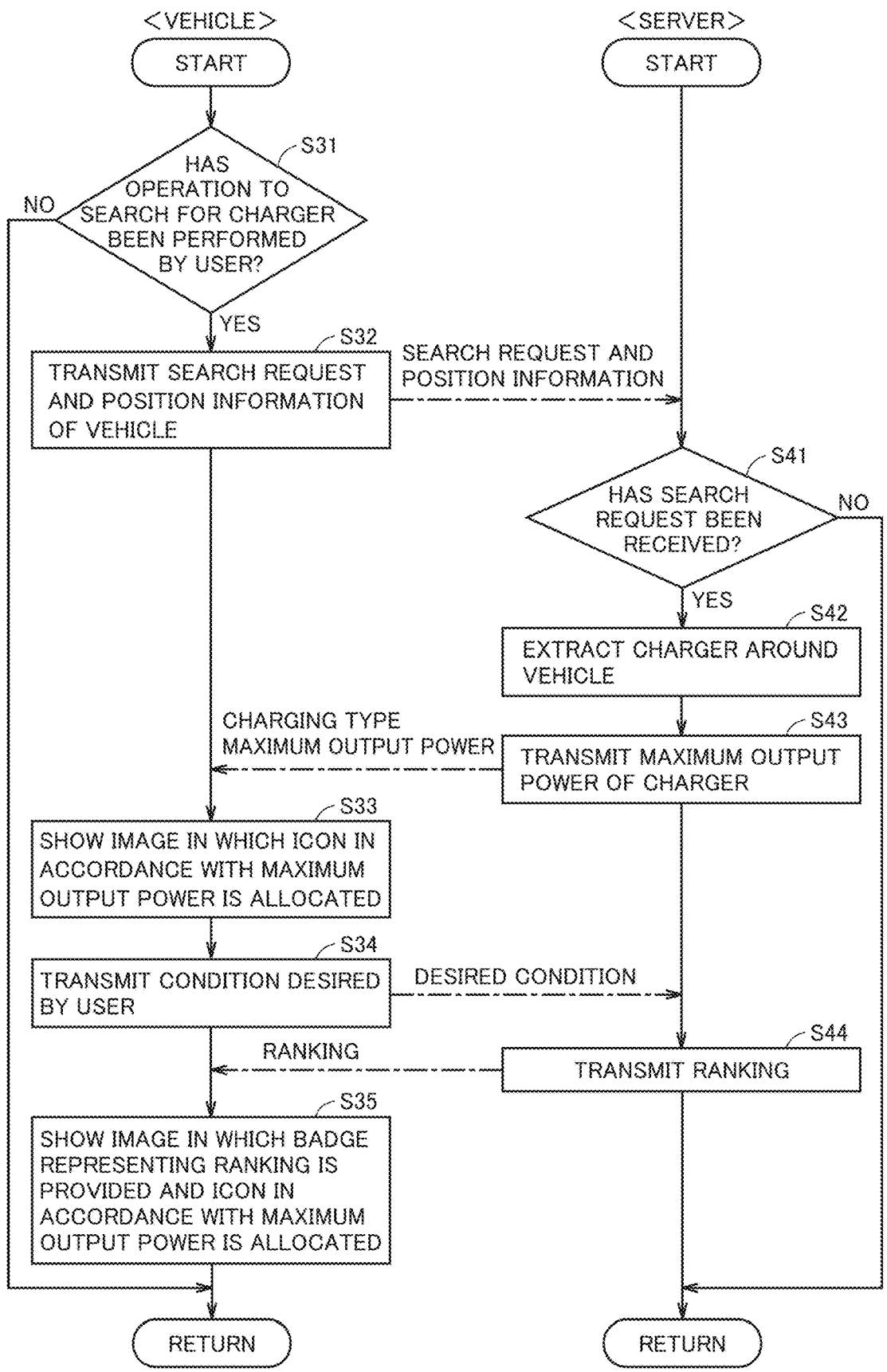
FIG. 12 is a flowchart for illustrating processing for showing a charger in the second embodiment.
Figure 14:
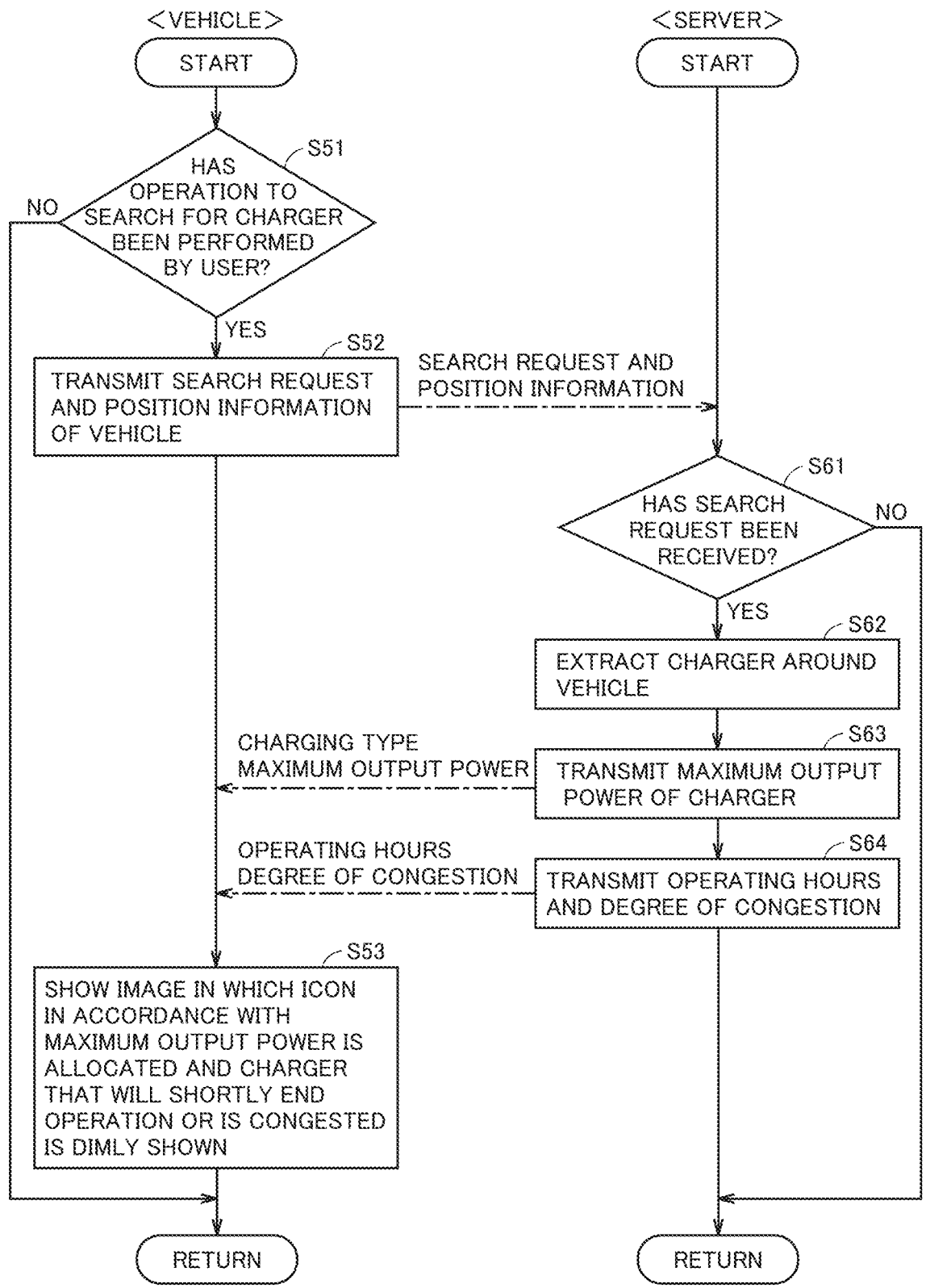
FIG. 14 is a flowchart for illustrating processing for showing a charger in the third embodiment.

FIG. 4 is a flowchart for illustrating processing for showing a charger in the first embodiment. In FIG. 4 and FIGS. 12 and 14 which will be described later, processing performed by ECU 100 of vehicle 1 is shown on the left in the figures and processing performed by server 4 is shown on the right in the figures. The flowchart is executed as being invoked from a not-shown main routine each time a prescribed condition is satisfied or each time a prescribed period elapses. Though each step (which is abbreviated as S below) is basically performed by software processing by ECU 100 or server 4, it may be performed by hardware processing by electronic circuits fabricated in ECU 100 or server 4.

Referring to FIG. 4, in S11, ECU 100 determines whether or not a user has performed an operation to search for charger 3. When the user has not performed a search operation (NO in S11), the process returns to the main routine. When navigation screen 82 has accepted a search operation by the user (YES in S11), ECU 100 transmits position information on a current location of vehicle 1 obtained by GPS receiver 81 to server 4 and transmits a request for search for charger 3 to server 4 (S12).

Server 4 stands by until it receives a request for search for charger 3 from vehicle 1 (NO in S21). When the server receives the search request from vehicle 1 (YES in S21), the process proceeds to S22. In S22, server 4 searches for a charger installed around the current location of vehicle 1. Charger information stored in a database (not shown) of server 4 is used for search for a charger as will be described below.

Figures 5, 6:
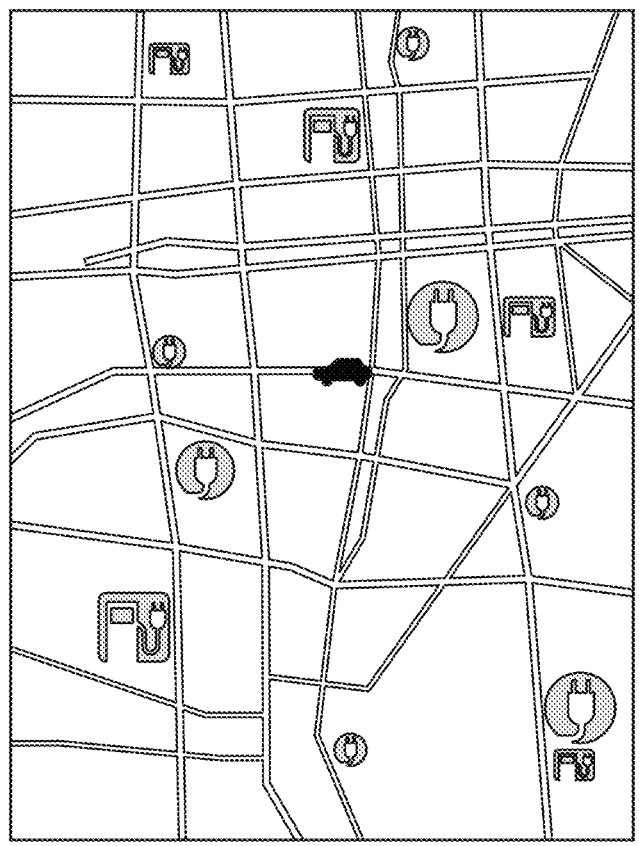
FIG. 5 is a conceptual diagram for illustrating exemplary charger information in the first embodiment.
FIG. 6 is a diagram showing an exemplary image shown on a navigation screen in the first embodiment.

FIG. 5 is a conceptual diagram for illustrating exemplary charger information in the first embodiment. Referring to FIG. 5, in charger information, for each of a plurality of chargers, for example, identification information (charger ID) of a charger, position information on a location where a charger is installed, information on a charging type (which is also called a charging standard) to which a charger is adapted (charging type information), and information on maximum output power of a charger (output electric power information) are associated with one another.

Referring back to FIG. 4, server 4 extracts a charger installed around the current location of vehicle 1 by referring to charger information. For example, server 4 extracts a charger installed within a prescribed radius (for example, within several kilometers) around the current location of vehicle 1. Alternatively, server 4 may extract a charger installed within a prescribed range along a road extending from the current location of vehicle 1. Server 4 then transmits the position information, the charging type information, and the output electric power information of the extracted charger to vehicle 1 (S23).

When ECU 100 receives the position information, the charging type information, and the output electric power information of the charger from server 4, it generates a navigation image in which an icon has been allocated in accordance with the charging type and maximum output power of each charger, as described with reference to FIG. 3. ECU 100 then controls navigation screen 82 to show the generated navigation image (S13).

FIG. 6 is a diagram showing an exemplary navigation image in the first embodiment. As shown in FIG. 6, navigation screen 82 shows an icon representing a current location of vehicle 1 (see the center of the image). In addition, navigation screen 82 shows icons representing a plurality of chargers 3 installed around the current location of vehicle 1. The normal charger and the quick charger are different from each other in shape of the icon representing charger 3. A size of an icon representing charger 3 is larger as maximum output power is higher for each of the normal charger and the quick charger.

When an operation by a user to select any icon has been accepted in the navigation image as shown in FIG. 6, ECU 100 may control navigation screen 82 to show detailed information on the charger corresponding to the selected icon. ECU 100 can control navigation screen 82 to show the position information (address), the charging type information, and the output electric power information of the charger corresponding to the selected icon, based on the charger information shown in FIG. 5. The user can thus readily check detailed information on the charger selected by the user himself/herself.

As set forth above, in the first embodiment, maximum output power of charger 3 is in direct proportion to a size of the icon, and the icon is larger as maximum output power is higher. Therefore, the user can intuitively determine magnitude of maximum output capability of charger 3 based on a size of the icon. Therefore, according to the present embodiment, the user can readily determine a charger with which vehicle 1 is to externally be charged.

Whether a charger is a normal charger or a quick charger is indicated by a shape of an icon. The user knows to which of normal charging and quick charging vehicle 1 of the user himself/herself is adapted. When vehicle 1 is adapted to only one of normal charging and quick charging, the user can exclude charger 3 not adapted to a charging type in common to vehicle 1 from candidates, and determine charger 3 to be used for external charging from among chargers 3 adapted to the charging type in common to vehicle 1. When vehicle 1 is adapted to only one of normal charging and quick charging, ECU 100 may control navigation screen 82 not to show a charger under the charging type to which vehicle 1 is not adapted.

Though an example in which charger information is stored in the database within server 4 is described in the present embodiment, such storage may be omitted in some embodiments. The charger information may be stored in a memory (not shown) of car navigator 80. ECU 100 can extract charger 3 around vehicle 1 and obtain the charging type and maximum output power of extracted charger 3 by referring to the charger information stored in the memory of car navigator 80 (that is, without communicating with server 4).

Some chargers are adapted to "wireless charging" in which electric power is wirelessly transmitted from a power transmitter buried in the ground to a power receiver mounted on a vehicle. For a charger adapted to wireless charging in addition to or instead of normal charging and quick charging as well, a larger icon may be shown as the charger is higher in maximum output power.

[First Modification]

In the first embodiment, a size of an icon is described as being adjusted in accordance with maximum output power of charger 3. The manner of showing an image that can be varied in accordance with maximum output power of charger 3, however, is not limited to the size of the icon but another characteristic of the icon may be adjusted.

Figure 7:
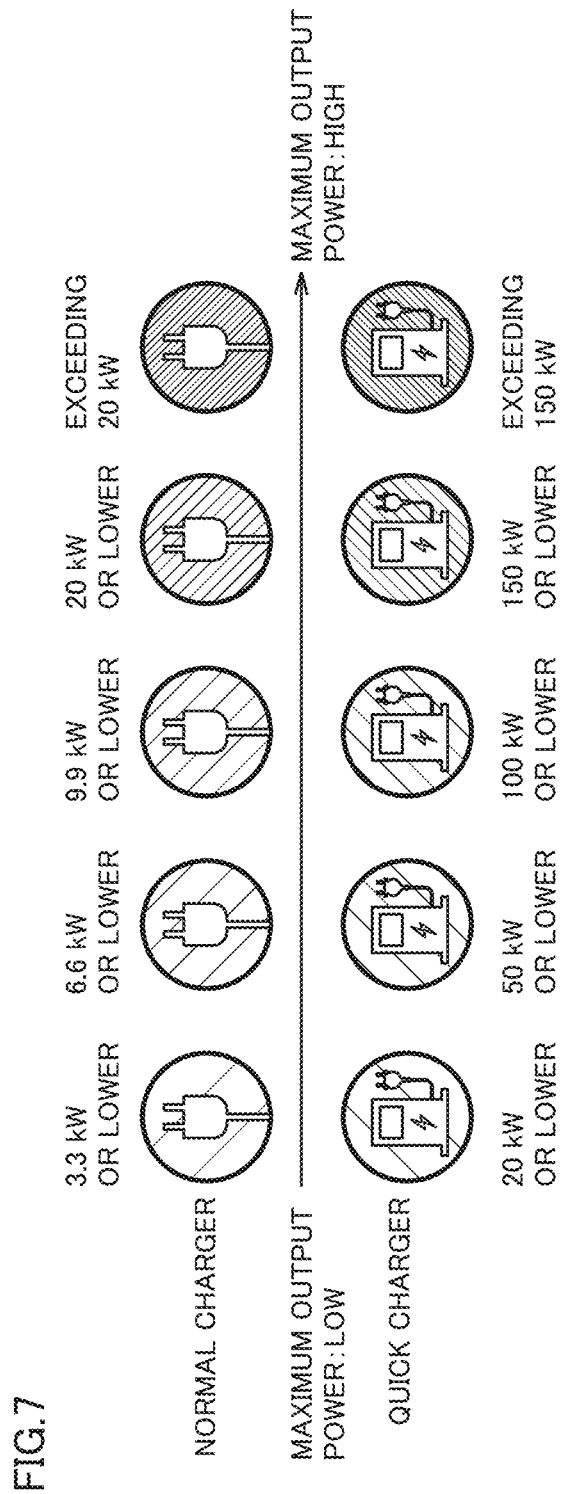
FIG. 7 is a diagram for illustrating a manner of showing an icon in a modification of the first embodiment.

FIG. 7 is a diagram for illustrating a manner of showing an icon in a first modification of the first embodiment. In the example shown in FIG. 7 as well, as in the first embodiment described previously, chargers are categorized into normal chargers and quick chargers and then maximum output power of each of the normal charger and the quick charger is categorized into five levels. In the present modification, a more emphasizing color is used for a charger higher in maximum output power, as a color of an icon representing a position of the charger.

In general, a warm color longer in wavelength is called an "advancing color" and looks as if it were popping up forward. A cold color shorter in wavelength is called a "receding color" and looks as if it were receding rearward. Therefore, the warm color is conspicuous and the cold color is inconspicuous. In other words, the warm color is high in degree of emphasis and the cold color is low in degree of emphasis. Therefore, in the example shown in FIG. 7, for the normal charger, for example, a charger of which maximum output power exceeds 20 kW is shown with red, a charger of which maximum output power is higher than 9.9 kW and not higher than 20 kW is shown with orange, a charger of which maximum output power is higher than 6.6 kW and not higher than 9.9 kW is shown with yellow, a charger of which maximum output power is higher than 3.3 kW and not higher than 6.6 kW is shown with green, and a charger of which maximum output power is not higher than 3.3 kW is shown with blue.

Though detailed description will not be repeated, similarly for the quick charger, maximum output power is categorized into five levels, and a more emphasizing color is allocated to a charger higher in maximum output power, as a color of an icon representing a position of the quick charger.

In addition to or instead of a color of an icon, a density of an icon may be varied. A charger higher in maximum output power is more emphasized with a density of an icon being set to be higher, and a charger lower in maximum output power is less emphasized with a density of an icon being set to be lower. By thus setting at least one of the color and the density of the icon for maximum output power, emphasis/non-emphasis of the icon can be adjusted.

Figure 8:
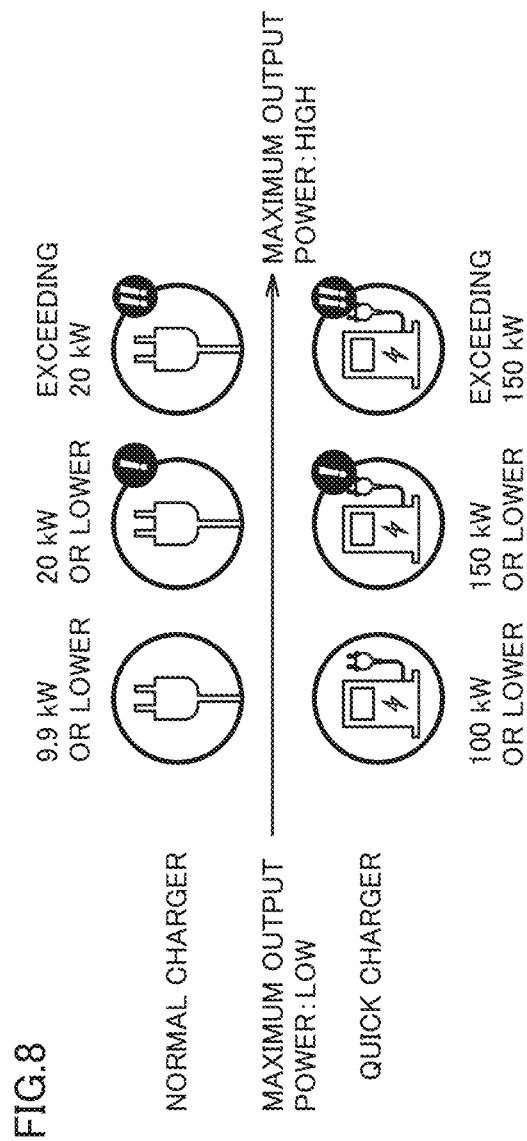
FIG. 8 is another diagram for illustrating a manner of showing an icon in the modification of the first embodiment.

FIG. 8 is another diagram for illustrating a manner of showing an icon in the first modification of the first embodiment. Referring to FIG. 8, a charger higher in maximum output power may be more emphasized by attaching a badge (mark) in accordance with maximum output power to an icon. In the example shown in FIG. 8, a badge in a shape of an exclamation mark is shown as being superimposed on the icon. More specifically, maximum output power is categorized into three levels, a badge including two exclamation marks is attached to a charger highest in maximum output power, a badge including one exclamation mark is attached to a charger next highest in maximum output power, and no badge is attached to a charger lowest in maximum output power.

A user can thus be provided with information on maximum output power of a charger also based on whether or not a badge is attached or on the number of signs (exclamation marks in the example above) in the badge. Instead of showing a badge as being superimposed on an icon, the badge may be shown in proximity to the icon.

As set forth above, according to the first modification of the first embodiment, user's attention is attracted to a charger higher in maximum output capability by using a color or a density of an icon or a badge attached to the icon. The user can thus intuitively obtain magnitude of maximum output power of a charger and readily determine a charger with which vehicle 1 is to externally be charged.

[Second Modification]

When a destination of vehicle 1 has been set in car navigator 80 or when vehicle 1 has a registered point, car navigator 80 may show only an icon of a charger installed around the destination and/or the registered point. For example, car navigator 80 may allow a user to select a preferred representation mode from among three representation modes (first to third representation modes) which will be described below.

The first representation mode is a mode in which a charger installed around a current location of vehicle 1 is shown (see FIG. 6). The second representation mode is a mode in which a charger installed around a destination of vehicle 1 is shown (a charger installed around a registered point is not shown). The third representation mode is a mode in which a charger installed around a destination and a registered point of vehicle 1 is shown. In each representation mode, as described in the first embodiment and the first modification, a manner of showing an icon is determined such that a charger higher in maximum output capability is more emphasized by adjusting at least one of a size, a color, a density, and a badge of an icon.

After vehicle 1 arrives at the destination (and/or the registered point), the user is highly likely to have things to do such as shopping, meal, or leisure. Therefore, while the user is doing what he/she has to do at the destination or the like, there may be an idle time during which vehicle 1 can externally be charged. According to a second modification of the first embodiment, ECU 100 controls navigation screen 82 to selectively show an icon corresponding to a charger installed within a determined area such as an area around the destination and/or the registered point of vehicle 1. The user can thus readily select a charger with which vehicle 1 can externally be charged by making use of an idle time. Though detailed description is not repeated, this is also applicable to second and third embodiments which will be described later.

A charger selectively shown on navigation screen 82 is not limited to a charger determined based on a destination or a registered point of vehicle 1. For example, based on a cruising distance (what is called an EV distance) of vehicle 1, a charger installed at a position almost at the EV distance of vehicle 1 within a range where vehicle 1 can reach may selectively be shown on navigation screen 82. By thus carrying out external charging after electric power stored in battery 40 is used as much as possible, the number of times of charging can be reduced and hence convenience of a user can be improved.

Second Embodiment

In the second embodiment, an example in which chargers recommended to a user are placed in order (ranked) will be described. Since the configuration of the charging system in the second embodiment is similar to the configuration shown in FIGS. 1 and 2, description will not be repeated.

FIG. 9 is a conceptual diagram for illustrating exemplary charger information in the second embodiment. Referring to FIG. 9, charger information in the second embodiment includes information on a charging fee of a charger (charging fee information) in addition to the identification information, the position information, the charging type information, and the output electric power information of the charger.

In the second embodiment, a user performs an operation to select a condition indicating his/her desire about what kind of charger is to be used for external charging of vehicle 1 (which is also denoted as a "desired condition" below) onto a touch panel on navigation screen 82. Then, an image as shown in FIG. 10 is shown on navigation screen 82.

FIG. 10 is a diagram showing an exemplary navigation image for obtaining a condition desired by a user. The user selects, for example, a charging type of the charger and output power of the charger the user desires, by operating navigation screen 82 (touch panel). In the example shown in FIG. 10, the user is assumed to have selected a normal charger of which maximum output power is higher than 3.3 kW and not higher than 6.6 kW. As the user thus inputs the desired condition, an image that shows a charger recommended to the user is shown on navigation screen 82.

Figure 11:
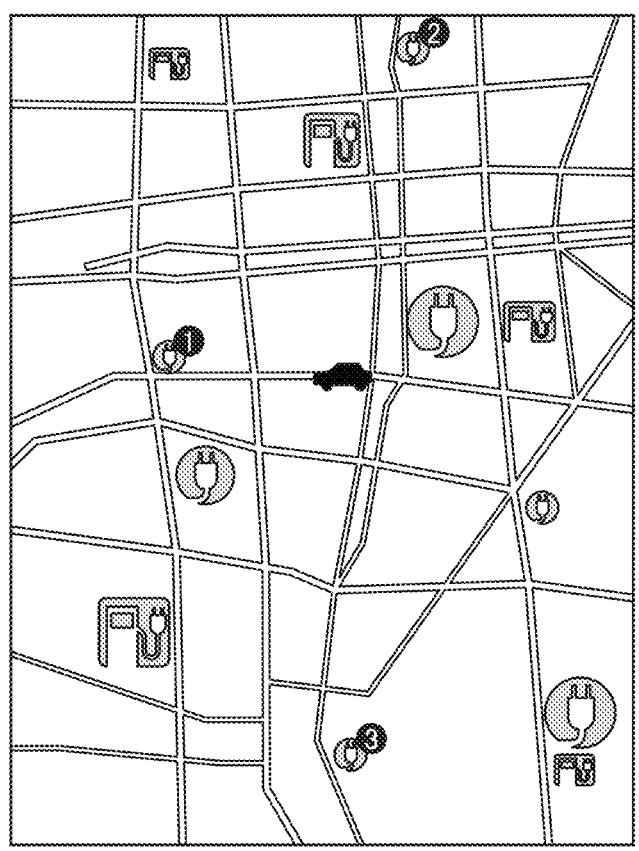
FIG. 11 is a diagram showing an exemplary manner of showing a navigation image including an icon representing a ranked charger.

FIG. 11 is a diagram showing an exemplary manner of showing a navigation image including an icon representing a ranked charger. Referring to FIG. 11, server 4 ranks chargers recommended to the user among chargers that satisfy the condition desired by the user and provides a result of ranking to the user. For example, the charging fee information and the position information of each charger are used for ranking of the chargers (details of which will be described later). In the example shown in FIG. 11, three chargers are recommended to the user by attaching a badge indicating the first place, the second place, or the third place to an icon.

FIG. 12 is a flowchart for illustrating processing for showing a charger in the second embodiment. Referring to FIG. 12, processing in S31 to S33 and S41 to S43 is the same as the processing in S11 to S13 and S21 to S23 (see FIG. 4) in the first embodiment. Though detailed description is not repeated, server 4 searches for a charger around a current location of vehicle 1 and extracts a charger installed around the current location of vehicle 1 (S42). Then, server 4 transmits position information, charging type information, and output electric power information of the extracted charger to vehicle 1 (S43). When ECU 100 receives the position information, the charging type information, and the output electric power information of the charger from server 4, it generates an image (see FIG. 6) in which an icon has been allocated in accordance with the charging type and maximum output power of each charger, and controls navigation screen 82 to show the generated image (S33).

When the user who looked at the navigation image performs an operation to indicate his/her desire to narrow down the charger, ECU 100 obtains a condition desired by the user as described with reference to FIG. 10 (S34). Then, ECU 100 transmits the obtained desired condition to server 4.

Server 4 ranks chargers to be recommended to the user among the chargers that satisfy the condition desired by the user (S44). For example, server 4 determines ranking based on the charging fee of each charger and a distance of travel for vehicle 1 to reach each charger. More specifically, server 4 gives each charger a score which is higher as the charging fee is more inexpensive. In addition, server 4 gives each charger a score which is higher as the distance of travel of vehicle 1 to the charger is shorter. Server 4 then ranks the chargers in the descending order of the total of the score in connection with the charging fee and the score in connection with the travel distance. Information on the order of chargers thus determined (ranking information) is transmitted to vehicle 1.

When ECU 100 receives ranking information from server 4 in S35, it generates a navigation image (see FIG. 11) in which an icon allocated in accordance with the charging type and maximum output power of the charger is provided with a badge representing the rank of the charger. ECU 100 then controls navigation screen 82 to show the generated navigation image.

In the manner of showing a navigation image, ECU 100 may control the navigation screen not to emphasize a charger that fails to satisfy the condition desired by the user. Alternatively, ECU 100 may control the navigation screen not to emphasize a charger low in ranking (in the example shown in FIG. 11, a charger lower than the third place). Specifically, ECU 100 can control the navigation screen to show a charger failing to satisfy the condition desired by the user more dimly than a charger that satisfies the condition desired by the user. Similarly, ECU 100 can control the navigation screen to show a charger lower in ranking more dimly than a charger higher in ranking. Alternatively, ECU 100 may control navigation screen 82 to show only a charger that satisfies the condition desired by the user (or a charger high in ranking) and not to show a charger failing to satisfy the condition desired by the user (or a charger low in ranking).

As set forth above, in the second embodiment, chargers are ranked based on a condition desired by a user, and a charger higher in ranking (in this example, a charges in the third place or higher) is more emphasized. By thus recommending to the user a charger that meets the desire of the user, the user can more readily determine an appropriate charger.

When an operation by a user to select any icon is accepted on the navigation image as shown in FIG. 11, ECU 100 may control navigation screen 82 to show detailed information on a charger corresponding to the selected icon as in the first embodiment. In the second embodiment, ECU 100 can control navigation screen 82 to show position information, charging type information, output electric power information, and charging fee information of the charger corresponding to the selected icon.

Third Embodiment

In the third embodiment, for example, a configuration for not emphasizing a charger which is not suitable for use because of a short time period remaining until time of end of its operating hours will be described. The configuration of the charging system in the third embodiment is similar to the configuration shown in FIGS. 1 and 2.

FIG. 13 is a conceptual diagram for illustrating exemplary charger information in the third embodiment. Referring to FIG. 13, charger information in the third embodiment is different from the charger information (see FIG. 5) in the first embodiment in including information on operating hours of each of a plurality of chargers (operating hour information) and information on a degree of congestion of the charger (congestion degree information).

Operating hour information is information on a time period from time of start of operating hours until time of end of operating hours ("operation end time" in the present disclosure) determined in advance for each charging stand where a charger is installed. Congestion degree information is information, for example, on an average occupancy (a value calculated by dividing the number of chargers being used by the total number of chargers) of each of a plurality of chargers installed in a charging stand. Congestion degree information is not limited to an occupancy at the current time point but may be defined by an occupancy calculated based on records of use in the past of a charger (for example, an occupancy during the same time period on the same day of the week).

FIG. 14 is a flowchart for illustrating processing for showing a charger in the third embodiment. Referring to FIG. 14, processing in S51, S52, and S61 to S63 is similar to the processing in S11, S12, and S21 to S23 (see FIG. 4) in the first embodiment. Server 4 transmits to vehicle 1, position information, charging type information, and output electric power information of the charger extracted in S62 based on a current location (or a destination) of vehicle 1 by referring to the charger information (S63). In the third embodiment, server 4 further transmits operating hour information and congestion degree information of the charger to vehicle 1 by referring to the charger information (S64).

When a user selects a charger that will end operation shortly (a charger installed in a charging stand that will end operation shortly), the time of end of operating hours comes before vehicle 1 arrives at the charger (or immediately after the vehicle arrives) and vehicle 1 may not successfully externally be charged. Alternatively, a certain time period is required for external charging and hence external charging may not successfully be completed by the time of end of operating hours even though vehicle 1 arrives at the charger before the time of end of operating hours. When a user selects a charger high in degree of congestion, the charger may be occupied by another vehicle at the time of arrival of vehicle 1 at the charger. Then, the user has to wait until the charger is available and convenience of the user may be lowered.

In view of such circumstances, a charger that will end operation shortly or is congested is not recommended to a user. More specifically, in S53, ECU 100 allocates an icon in accordance with the charging type and maximum output power of each charger as in the first embodiment, and does not emphasize an icon of a charger of which operating time remaining from the current time until the time of end of operating hours is shorter than a prescribed time period (for example, one hour) and an icon of a charger of which degree of congestion (average occupancy described previously) is higher than a prescribed value.

Figure 15:
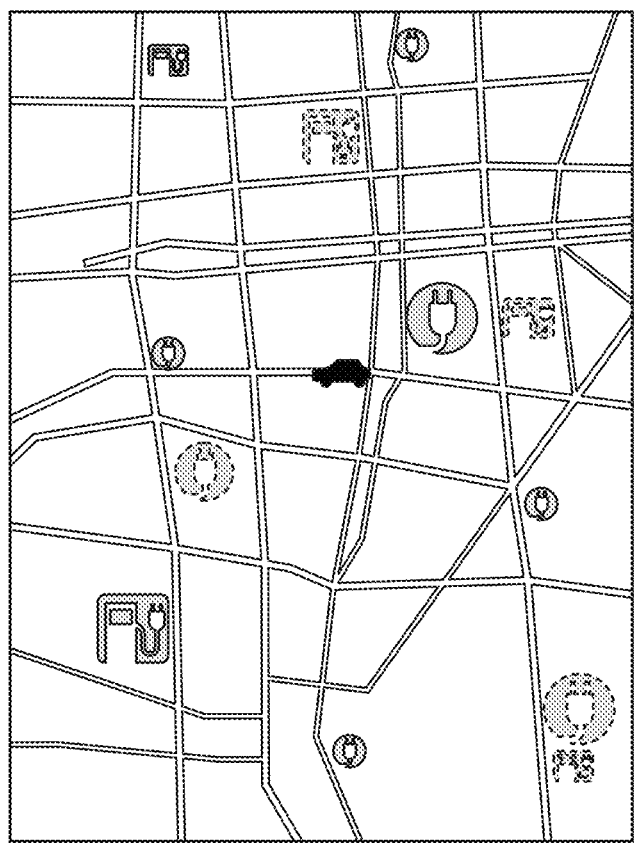
FIG. 15 is a diagram showing an exemplary manner of showing a navigation image including an icon representing a charger that will end operation shortly or is congested.

FIG. 15 is a diagram showing an exemplary manner of showing a navigation image including an icon representing a charger that will end operation shortly or is congested. In the third embodiment, an icon representing a charger of which operating time remaining until the time of end of operating hours is shorter than a prescribed time period (for example, one hour) and an icon representing a charger of which degree of congestion (average occupancy described previously) is higher than a prescribed value are shown at a lower density or translucently. For the sake of convenience of illustration, such an icon is shown with a dashed line in FIG. 15.

ECU 100 may show a charger after hours (out of operating hours) in a manner further less emphasized than a charger that will end operation shortly. For example, an icon can further be lower in density. Alternatively, an icon of the charger after hours does not have to be shown.

As set forth above, in the third embodiment, a charger that will end operation shortly or is congested is not emphasized. Since a charger not suitable for use is thus not recommended to a user, such a charger can be excluded without the user being aware of it and the user can more readily determine an appropriate charger.

Though an example in which both of time remaining until the time of end of operating hours and a degree of congestion are adopted as parameters for not emphasizing representation of an icon is described in the present embodiment, any one of them may be adopted as the parameter.

Though an example in which a charger that will end operation shortly is not emphasized is described previously, the charger that will end operation shortly may be emphasized on the contrary for quickly carrying out external charging. For example, an icon representing a charger that will end operation shortly can be caused to blink.

In the third embodiment as well, when an operation by a user to select any icon is accepted in the navigation image as shown in FIG. 15, ECU 100 may control navigation screen 82 to show detailed information on a charger corresponding to the selected icon. ECU 100 can control navigation screen 82 to show operating hour information and congestion degree information in addition to position information, charging type information, and output electric power information of the charger corresponding to the selected icon.

Though the embodiment of the present disclosure has been described, it should be understood that the embodiment disclosed herein is illustrative and non-restrictive in every respect. The scope of the present disclosure is defined by the terms of the claims and is intended to include any modifications within the scope and meaning equivalent to the terms of the claims.

What is claimed is:

1. An information instrument that provides information on a plurality of chargers that charge a power storage device mounted on a vehicle, the information instrument comprising:
   a display; and
   a controller that controls the display to show a map and to show a plurality of icons corresponding to the plurality of chargers at corresponding positions of the plurality of chargers on the map, wherein
   the controller controls the display to show the plurality of icons on the map to allow identification of (i) a charging type to which each of the plurality of chargers is adapted and (ii) magnitude of electric power that can be output under the charging type by looking at icons of the chargers shown on the map;
   the controller controls the display to show on the map, ranking of recommendation to a user of the vehicle, of each of the plurality of chargers; and
   the ranking of recommendation is determined based on a distance between a position of each of the plurality of chargers and the vehicle, and a charging fee of each of the plurality of chargers.

2. The information instrument according to claim 1, wherein
   the controller controls the display to show, for each charging type, the plurality of icons to emphasize an icon corresponding to a charger higher in electric power that can be output under the charging type among the plurality of chargers, as compared with a charger lower in electric power that can be output under the charging type.

3. The information instrument according to claim 2, wherein
   the controller emphasizes the corresponding icon of the charger higher in electric power that can be output under the charging type.

4. The information instrument according to claim 2, wherein
   the controller emphasizes the corresponding icon by adjusting a size of each of the plurality of icons.

5. The information instrument according to claim 2, wherein
   the controller emphasizes the corresponding icon by adjusting at least one of a color and a density of each of the plurality of icons.

6. The information instrument according to claim 2, wherein
   the controller emphasizes the corresponding icon by showing a badge as being superimposed on or being in proximity to each of the plurality of icons.

7. The information instrument according to claim 1, wherein
   the controller controls the display to selectively show an icon corresponding to a charger installed within a determined area including a destination or a registered point of the vehicle.

8. The information instrument according to claim 1, wherein
   the controller controls the display to show, when any icon is selected from among the plurality of icons, detailed information on a charger corresponding to the selected icon.

9. An information instrument that provides information on a plurality of chargers that charge a power storage device mounted on a vehicle, the information instrument comprising:
   a display; and
   a controller that controls the display to show a map and to show a plurality of icons corresponding to the plurality of chargers at corresponding positions of the plurality of chargers on the map, wherein
   the controller controls the display to show the plurality of icons on the map to allow identification of (i) a charging type to which each of the plurality of chargers is adapted and (ii) magnitude of electric power that can be output under the charging type by looking at icons of the chargers shown on the map; and
   the controller controls a manner of representation of the plurality of icons so as not to emphasize an icon corresponding to a charger of which operating time remaining until operation end time is shorter than a prescribed time period among the plurality of chargers, as compared with a charger of which remaining operating time is longer than the prescribed time period.

10. The information instrument according to claim 9, wherein
    the controller controls the display to show, for each charging type, the plurality of icons to emphasize an icon corresponding to a charger higher in electric power that can be output under the charging type among the plurality of chargers, as compared with a charger lower in electric power that can be output under the charging type.

11. The information instrument according to claim 10, wherein the controller emphasizes the corresponding icon of the charger higher in electric power that can be output under the charging type.

12. The information instrument according to claim 10, wherein
the controller emphasizes the corresponding icon by adjusting a size of each of the plurality of icons.

13. The information instrument according to claim 10, wherein
the controller emphasizes the corresponding icon by adjusting at least one of a color and a density of each of the plurality of icons.

14. The information instrument according to claim 10, wherein
the controller emphasizes the corresponding icon by showing a badge as being superimposed on or being in proximity to each of the plurality of icons.

15. The information instrument according to claim 9, wherein
the controller controls the display to selectively show an icon corresponding to a charger installed within a determined area including a destination or a registered point of the vehicle.

16. The information instrument according to claim 9, wherein
the controller controls the display to show, when any icon is selected from among the plurality of icons, detailed information on a charger corresponding to the selected icon.

17. An information instrument that provides information on a plurality of chargers that charge a power storage device mounted on a vehicle, the information instrument comprising:
a display; and
a controller that controls the display to show a map and to show a plurality of icons corresponding to the plurality of chargers at corresponding positions of the plurality of chargers on the map, wherein
the controller controls the display to show the plurality of icons on the map to allow identification of (i) a charging type to which each of the plurality of chargers is adapted and (ii) magnitude of electric power that can be output under the charging type by looking at icons of the chargers shown on the map; and
the controller controls a manner of representation of the plurality of icons so as not to emphasize an icon corresponding to a charger of which degree of congestion is higher than a prescribed value among the plurality of chargers, as compared with a charger of which degree of congestion is lower than the prescribed value.

18. The information instrument according to claim 17, wherein
the controller controls the display to show, for each charging type, the plurality of icons to emphasize an icon corresponding to a charger higher in electric power that can be output under the charging type among the plurality of chargers, as compared with a charger lower in electric power that can be output under the charging type.

19. The information instrument according to claim 17, wherein
the controller controls the display to selectively show an icon corresponding to a charger installed within a determined area including a destination or a registered point of the vehicle.

20. The information instrument according to claim 17, wherein
the controller controls the display to show, when any icon is selected from among the plurality of icons, detailed information on a charger corresponding to the selected icon.

* * * * *